United States Patent [19]

Imakura

[11] Patent Number: 5,724,399
[45] Date of Patent: Mar. 3, 1998

[54] TIMER DEVICE

[75] Inventor: Tatsuya Imakura, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 587,033

[22] Filed: Jan. 16, 1996

[30] Foreign Application Priority Data

Sep. 6, 1995 [JP] Japan ............... 7-229246

[51] Int. Cl.$^6$ ............... G07C 3/02
[52] U.S. Cl. ............... 377/16; 377/20
[58] Field of Search ............... 377/20, 16

[56] References Cited

FOREIGN PATENT DOCUMENTS 4211832  3/1992  Japan .
1377884  2/1988  U.S.S.R. ............... 377/16
2269030  1/1994  United Kingdom ............... 377/16

OTHER PUBLICATIONS

IBM Tech. Disc. Bul. vol. 26 No. 3A Aug. 1983 "Program Status Catch" Crosthwait et al, pp. 1177–1179.

Primary Examiner—Margaret Rose Wambach
Attorney, Agent, or Firm—Leydig, Voit & Mayer, Ltd.

[57] ABSTRACT

In a timer device, the counter thereof counts the number of the pulses of a pulse signal input from an external apparatus up to a count initial value to output a count ending signal at the time of the end of the counting, and the control signal generator thereof generates a signal for controlling the external apparatus on the count ending signal output from the counter, and further the count operation controller thereof controls the count operation of the counter on a state change signal indicating the change of the state of the external apparatus. Thereby, the timer device can execute extensive processing by means of few counters.

6 Claims, 12 Drawing Sheets

| NUMBER OF TIMES OF OUTPUTTING UDF | OUTPUT ORDER |
|---|---|
| 0 | $b_0$ |
| 1 | $b_1$ |
| 2 | $b_2$ |
| ⋮ | ⋮ |
| n−1 | $b_{n-1}$ |
| n | $b_n$ |

INITIAL VALUES OF OPERATION CONTROLLING REGISTER

| b7 | b6 | b5 | b4 | b3 | b2 | b1 | b0 |
|----|----|----|----|----|----|----|----|
| 1  | 1  | 1  | 0  | 0  | 1  | 0  | 0  |

| STATE | | | | | | | |
|---|---|---|---|---|---|---|---|
| (1) | | | | 1 | | | 1 |
| (2) | | | | 0 | | | 1 |
| (3) | | | | 0 | | | 0 |
| (1) | | | | 1 | | | 1 |
| (2) | | | | 0 | | | 1 |
| (3) | | | | 0 | | | 0 |

TIMER DEVICE

BACKGROUND OF THE INVENTION

1. Field of the Invention

This invention relates to a timer device which switches operation modes synchronously with a trigger signal input from a peripheral device indicating an external event.

2. Description of the Prior Art

A timer device disclosed in Japanese Published Unexamined Patent Application No. 211832/92 (Tokkai-Hei 4-211832) has two counters, one of which operates as an event counter, the clocks of which are input from the outside, and the other of which operates as a free-running counter measuring internal clocks. That is, the timer device has a counters in each of two different control systems, respectively, each of which performs only a single process.

Consequently, the aforementioned conventional timer device has problems as it can not deal with a process requiring varied processings, and as it is inconvenient to utilize the same timer device for a variety of uses.

Since the conventional timer device is constructed as described above, the timer experiences problems in that a CPU (Central Processing Unit) is overloaded when various processes are required of the timer device, and in that the same timer device can not be commonly utilized for several uses.

SUMMARY OF THE INVENTION

In view of the foregoing, it is an object of the present invention to provide a timer device capable of being used for many uses.

It is another object of the present invention to provide a timer device capable of executing various timer controls without overloading a CPU.

It is a further object of the present invention to provide a timer device capable of executing various timer controls with few counters.

It is a further object of the present invention to provide a timer device capable of executing timer control without overloading a CPU and the like when used in the timer control in which the timer device stops a operation of the CPU after executing a predetermined process from the continuously counting mode.

It is a further object of the present invention to provide a timer device capable of executing timer control without overloading the CPU in case where the timer device outputs a PWM (Pulse Width Modulation) signal in the continuously counting mode.

According to the first aspect of the present invention, for achieving the above-mentioned objects, there is provided a timer device comprising a counter for counting a number of the pulses of a pulse signal input from an external apparatus up to a loaded count initial value, and for outputting a count ending signal at the time of the end of the counting, a control signal generating means for generating a signal for controlling the external apparatus on the basis of the count ending signal output from the counter, and a count operation controlling means for controlling the count operation of the counter on the basis of a state change signal indicating the change of the state of the external apparatus.

According to the second aspect of the present invention, there is provided a timer device constructed to control the first register, the second register and the counter thereof to load the counter with a first count initial value from the first register to make the counter execute its count operation when a state change signal is input into the second inputting means thereof, and to load the counter with a second count initial value from the second register to make the counter execute its count operation when the counting of the first count initial value ends.

According to the third aspect of the present invention, there is provided a timer device constructed so as to choose a pulse signal output from an external apparatus when a state change signal is input into the timer device, and to choose an internal clock after the counter thereof has counted up to a first count initial value, for supplying the chosen signal or the chosen clock to the counter.

According to the fourth aspect of the present invention, there is provided a timer device constructed to change the mode of the counter thereof from the continuously counting mode thereof to the one shot mode when a state change signal is input therein while the counter operates in the continuously counting mode.

According to the fifth aspect of the present invention, there is provided a timer device constructed to stop the operation of the counter after resetting the output data register and outputting a predetermined number of stored data from the first data in order when a state change signal is input therein.

According to the sixth aspect of the present invention, there is provided a timer device constructed to load the counter with a first count initial value stored in the first register and a second count initial value stored in the second register in order when a state change signal is input therein while the counter operates the continuously counting mode, and to invert the output signal of the control signal generating means thereof at every time when a count ending signal is output from the counter to output a pulse having a width corresponding to the largeness of the first count initial value and the second count initial value.

BRIEF DESCRIPTION OF THE DRAWINGS

Further objects and advantages of the present invention can be more fully understood from the following detailed description taken in conjunction with the accompanying drawings, in which.

DETAILED DESCRIPTION OF THE PREFERRED EMBODIMENTS

Preferred embodiments of the present invention will now be described in detail with reference to the accompanying drawings.

EMBODIMENT 1.

Figure 1:
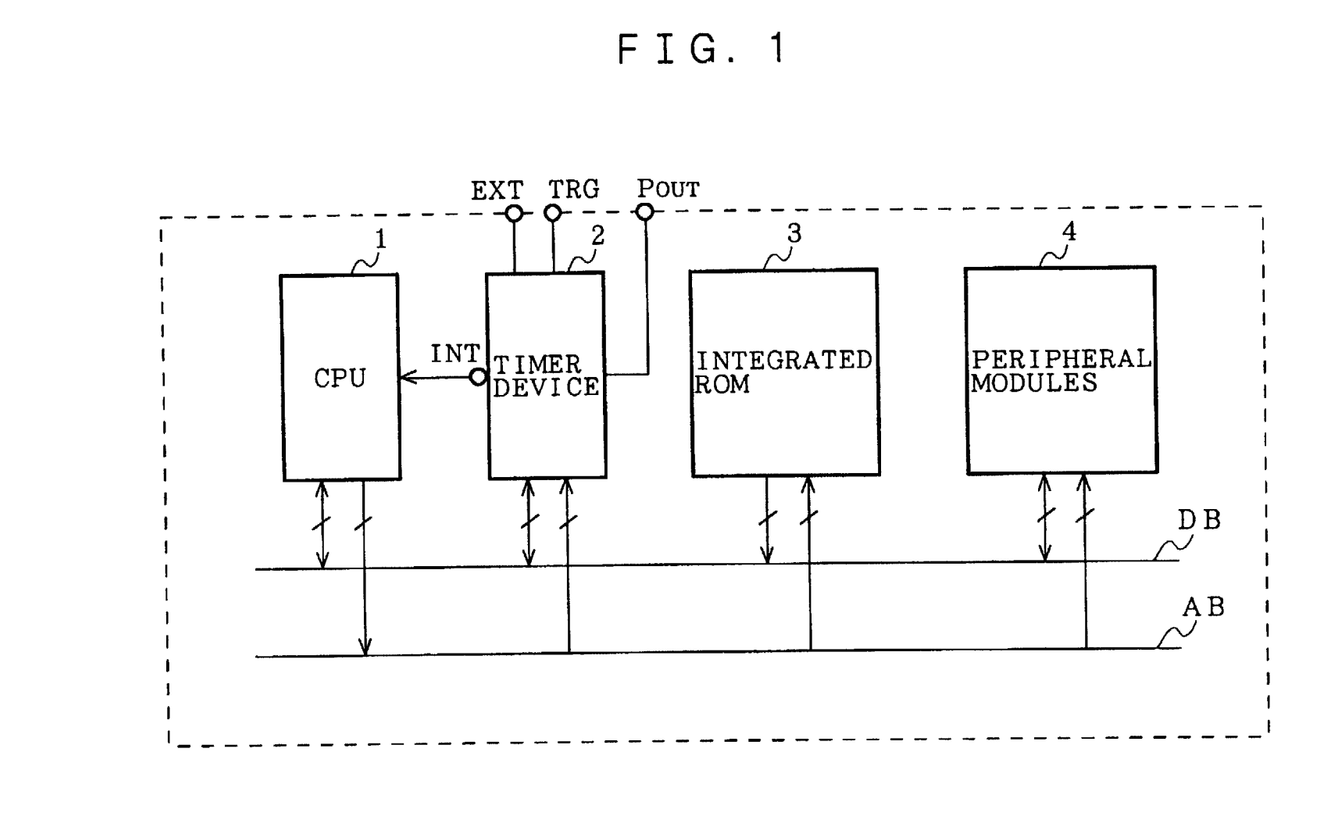
FIG. 1 is a block diagram showing the construction of a single chip microcomputer comprising a timer device of a first embodiment (embodiment 1) of the present invention.

FIG. 1 is a block diagram showing the construction of a single chip microcomputer to which the timer device of embodiment 1 of the present invention is applied. In the figure, reference numeral 1 denotes a CPU. Reference numeral 2 denotes the timer device. Reference numeral 3 denotes an integrated ROM (Read Only Memory). Reference numeral 4 denotes the other peripheral modules. Reference letter DB denotes a data bus. Reference numeral AB denotes an address bus.

Figure 2:
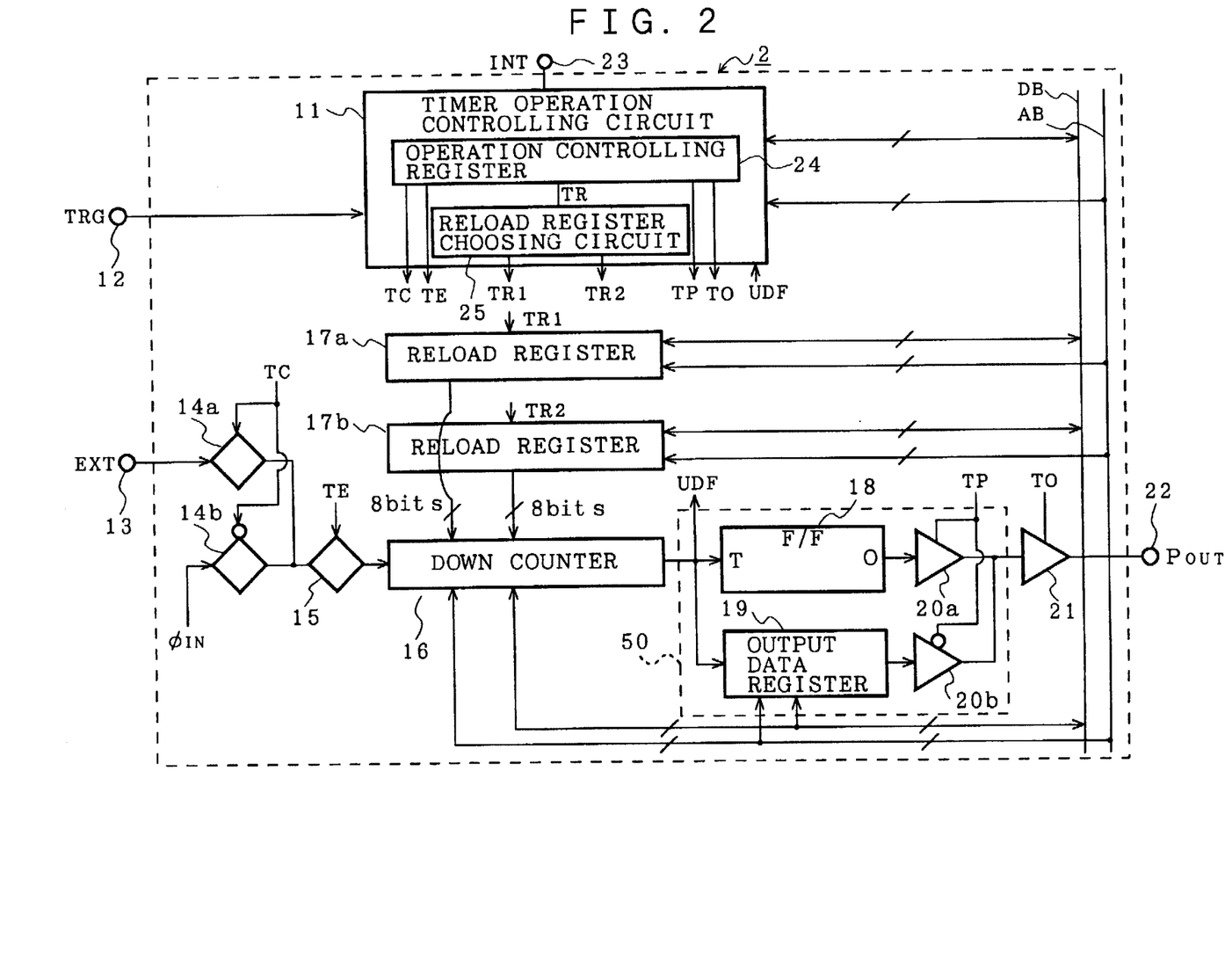
FIG. 2 is a diagram showing the construction of the timer device of embodiment 1.

FIG. 2 is a diagram showing the construction of the timer device of embodiment 1 of the present invention. In the figure, reference numeral 11 denotes a timer operation controlling circuit for controlling the operation of the timer device 2. Reference numeral 12 denotes an input terminal for inputting an external trigger TRG, which is an event occurrence signal, from the outside. Reference numeral 13 denotes an input terminal for inputting an external clock EXT. Reference numerals 14a and 14b denote transmission gates for choosing between the external clock EXT or an internal clock $\Phi_{IN}$ on an input clock switching signal TC from the timer operation controlling circuit 11. Reference numeral 15 denotes a transmission gate for turning on or off the clock signals on a timer enable signal TE from the timer operation controlling circuit 11. Reference numeral 16 denotes a down counter for counting an output signal from the transmission gate 15. Reference numeral 17a denotes a reload register for storing the data transmitted from the CPU 1, and for storing the stored data in the down counter 16 as a count initial value on the basis of a reload register choosing signal TR1 of the timer operation controlling circuit 11. Reference numeral 17b denotes a reload register for storing the data transmitted from the CPU 1, and for storing the stored data in the down counter 16 as a count initial value on the basis of a reload register choosing signal TR2 of the timer operation controlling circuit 11. Reference numeral 18 denotes a toggle flip flop inverting the output thereof every time the down counter 16 outputs an under flow signal UDF (count ending signal). Reference numeral 19 denotes an output data register outputting a data train previously stored therein every time the down counter 16 outputs an under flow signal UDF. Reference numerals 20a and 20b denote output buffers for choosing one of the outputs of the toggle flip flop 18 and the output data register 19 on the basis of an output pulse switching signal TP output from the timer operation controlling circuit 11. Reference numeral 21 denotes an output buffer for controlling the output chosen by the output buffers 20a and 20b to be output to the outside or not on the basis of a port output control signal TO output from the timer operation controlling circuit 11. Reference numeral 22 denotes an output terminal for outputting the output signal of the output buffer 21 outside of the timer device 2. Reference numeral 23 denotes an output terminal for outputting an interrupt signal INT from the timer operation controlling circuit 11 to the CPU 1. Reference numeral 24 denotes an operation controlling register installed in the timer operation controlling circuit 11 for controlling the timer device 2. Reference numeral 25 denotes a reload register choosing circuit for generating the reload register choosing signals TR1 and TR2 instructing the reload registers 17a and 17b to reload their counter initial values into down counter 16 on the basis of the data of the operation controlling register 24. When the timer operation controlling circuit 11 receives an under flow signal UDF, the circuit 11 outputs an interrupt signal INT to the CPU 1 indicating an end of the counting of the down counter 16. Reference numeral 50 denotes a control signal generating circuit comprising the toggle flip flop 18, the output data register 19 and the output buffers 20a and 20b.

Figure 3:
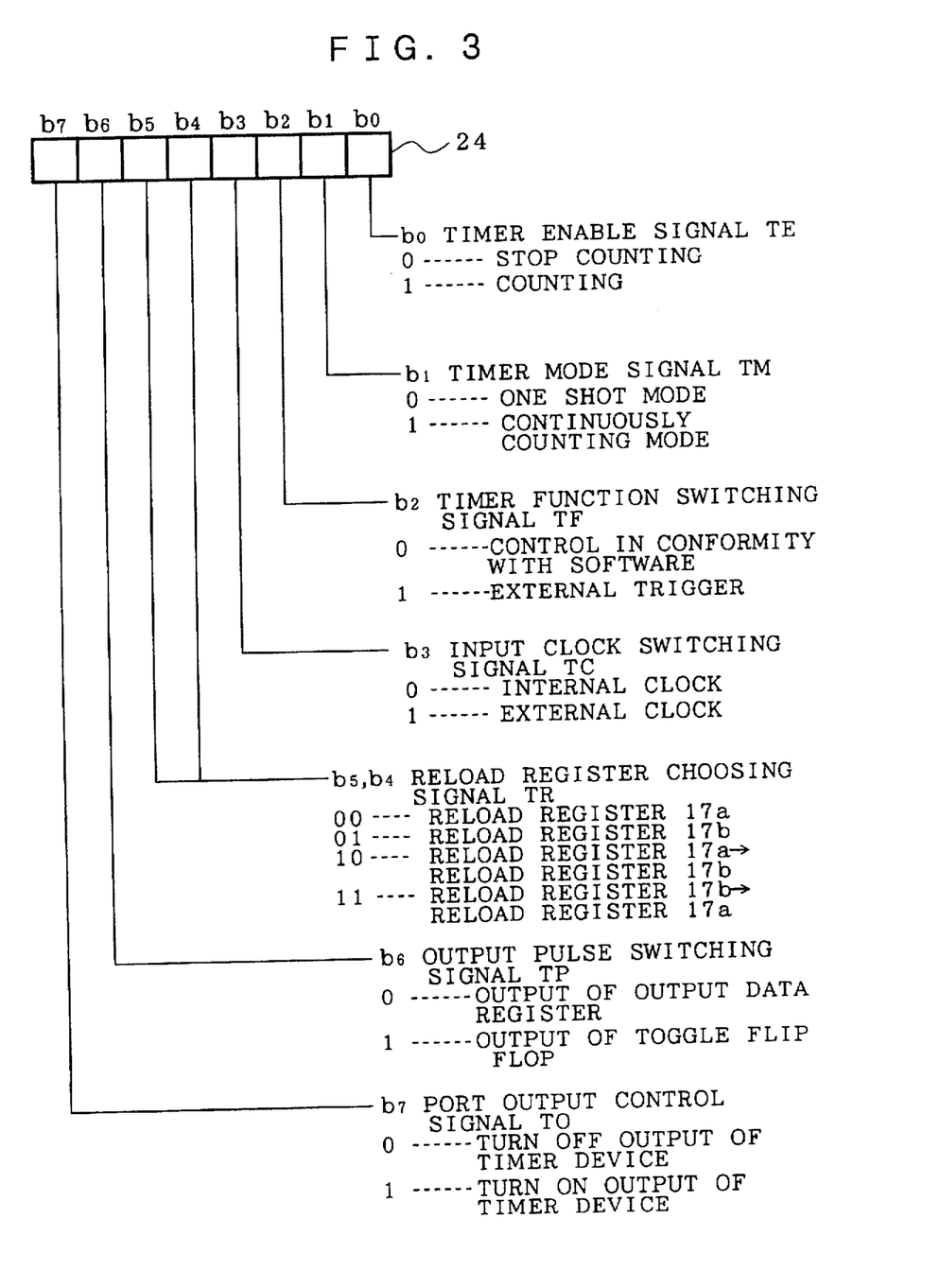
FIG. 3 is a diagram showing the construction of the operation controlling register of the timer device of embodiment 1.

FIG. 3 is a diagram showing the data structure in the operation controlling register 24. In the first bit $b_0$ of the register 24, a timer enable signal TE for enabling the timer device 2 is stored. If the bit $b_0$ is "0", the timer device 2 stops the counting operation; if "1", the device 2 executes the counting operation. In the second bit $b_1$, a timer mode signal TM is stored. If the bit $b_1$ is "0", the timer device 2 operates in the one shot mode; if "1", the device 2 operates in the continuously counting mode. The one shot mode means a mode where timer operation is terminated when a count initial value from the reload register 17a or 17b is loaded in the timer device 2 and the count operation is terminated; the continuously counting mode means a mode where a count initial value from the reload register 17a or 17b is again loaded in the timer device 2 and the device 2 executes the counting operation continuously when a count initial value from the reload register 17a or 17b is loaded therein and the counting operation is terminated. In the third bit $b_2$, a timer function switching signal TF is stored. If the bit $b_2$ is "0", the function of the timer device 2 is switched in conformity with software under the control of the CPU 1; if "1", the function of the timer device 2 is switched in conformity with an external trigger signal TRG input from the input terminal 12. In the fourth bit $b_3$, an input clock switching signal TC is stored. If the bit $b_3$ is "0", an internal clock $\Phi_{IN}$ is chosen; if "1", an external clock EXT is chosen. In the fifth bit $b_4$ and the sixth bit $b_5$, the reload register choosing signals TR1 and TR2 for choosing a reload register to which data is reloaded in the down counter 16 are stored respectively. If "0" and "0" are stored in the fifth bit $b_4$ and the sixth bit $b_5$, respectively, the reload register 17a is chosen. If "1" and "0" are stored in the fifth bit $b_4$ and the sixth bit $b_5$, respectively, the reload register 17b is chosen. If "0" and "1" are stored in the fifth bit $b_4$ and the sixth bit $b_5$, respectively, the reload register 17a is chosen for reloading at first, and after that the reload register 17b is chosen successively when the counting of the down counter 16 is terminated. If "1" and "1" are stored in the fifth bit $b_4$ and the sixth bit $b_5$, respectively, the reload register 17b is chosen for reloading at first, and after that the reload register 17a is chosen successively when the counting of the down counter 16 is terminated. In the seventh bit $b_6$, an output pulse switching signal TP is stored. If the bit $b_6$ is "0", an output of the output data register 19 is chosen; if "1", an output of the toggle flip flop 18 is chosen. In the eighth bit $b_7$, a port output control signal TO is stored. If the bit $b_7$ is "0", the output terminal 22 of the timer device 2 is turned off; if "1", a signal chosen by the output buffers 20a and 20b is output from the output terminal 22.

Figure 4:
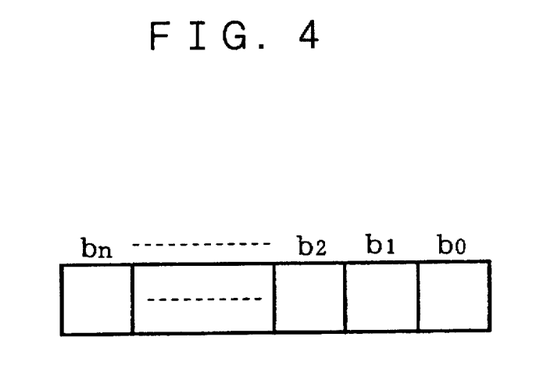
FIG. 4 is a diagram showing the register construction of the output data register of embodiment 1.

FIG. 4 is a diagram showing the data structure in the output data register 19. As shown in the figure, the output data register 19 previously stores data having (n+1) bits, from $b_0$ to $b_n$, therein.

Figure 5:
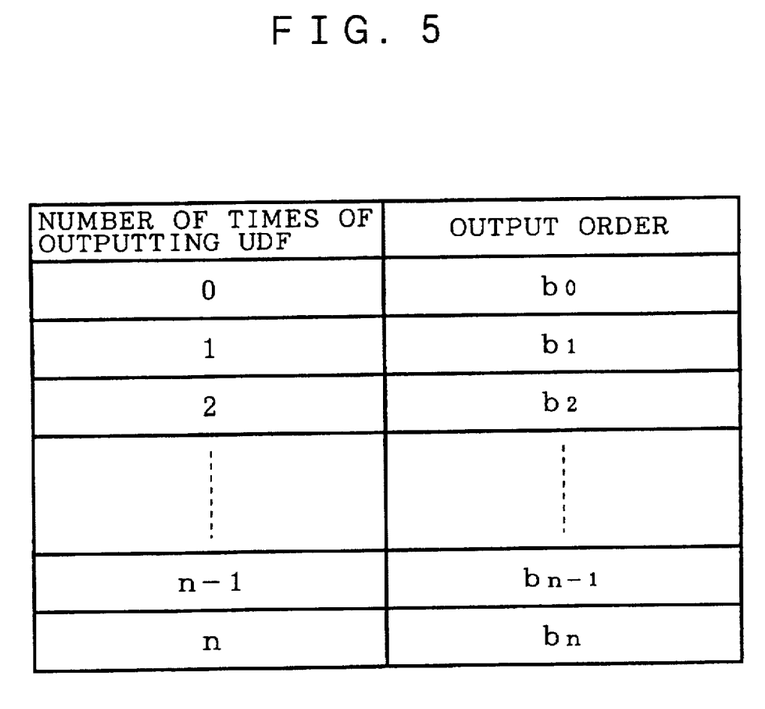
FIG. 5 is a chart showing relationships between the number of times of outputting an under flow signal and bit signals output from the output date register in embodiment 1.

FIG. 5 is a chart showing relationships between the number of times of the output of an under flow signal UDF and bit signals output from the output date register 19. As shown in the chart, data is output from the output data register 19, one bit at time, in order, every time an under flow signal UDF is output.

Next, the operation will be described. In the following description of the operation, a single chip microcomputer having a timer device according to the present invention is applied to the control of a fuel injection mechanism of an engine.

Figure 6:
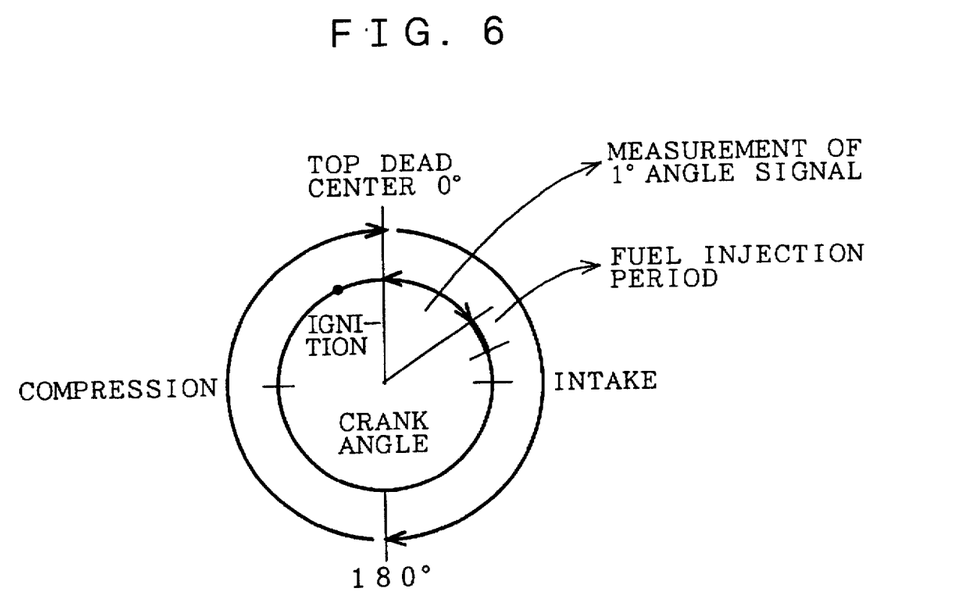
FIG. 6 is a diagram showing the crank angles of an engine which is an object of control in embodiment 1 and the states of the engine.
Figure 7:
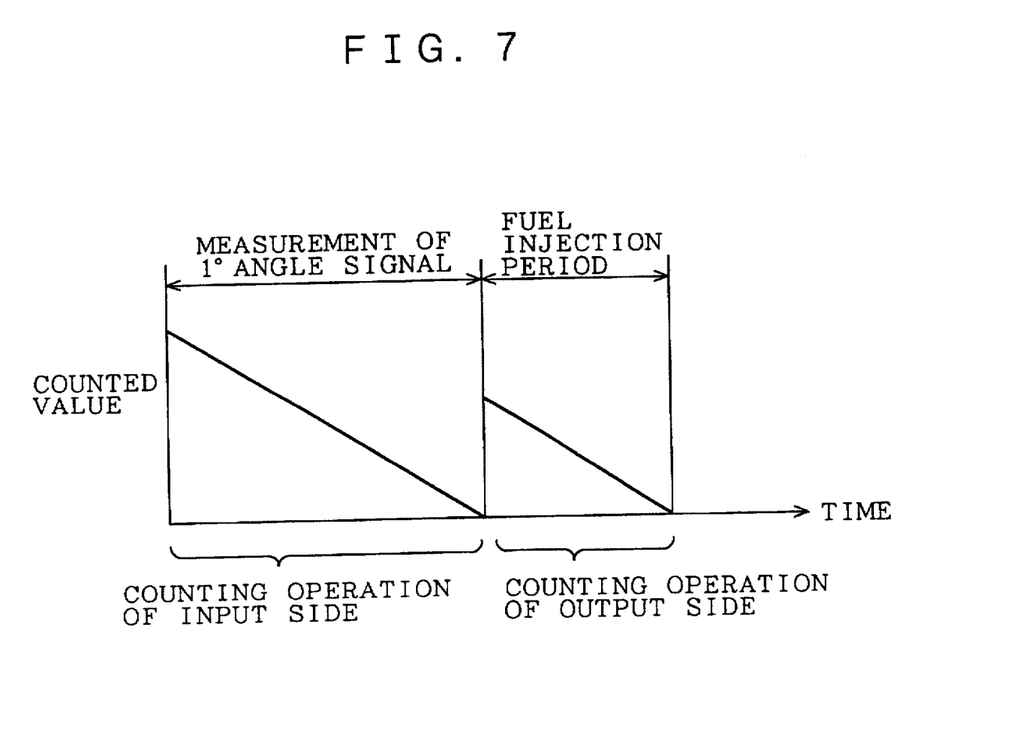
FIG. 7 is a graph showing count values of a counter versus time in case of FIG. 6.

FIG. 6 is a diagram showing the crank angles of the engine which is the object of the control and the states of the engine. As shown in the figure, a piston of the engine has an intake cycle and a compression cycle while a crank rotates one time. In the following, a case where fuel injection is intended to be performed at an appropriate crank angle position during an intake cycle will be considered. FIG. 7 is a graph showing the count values of the counter versus time in case of FIG. 6. As shown in FIG. 7, for executing control of an engine, it is required to measure the pulses of a 1' angle signal, an input side counting operation, and it is also required to measure a fuel injection period, an output side counting operation. In the present embodiment, both of the measurements can be performed by means of one counter. A top dead center detection signal before intake indicating the arrival of a crank at the top dead center before intake is input into the timer device 2 from the input terminal 12 as an external trigger TRG, which is a signal indicating the occurrence of an external event, and a 1' angle signal of the crank is input into the timer device 2 from the input terminal 13 as an external clock EXT. And then, a signal POUT indicating execution of the fuel injection of the engine is output from the output terminal 22.

Figure 8:
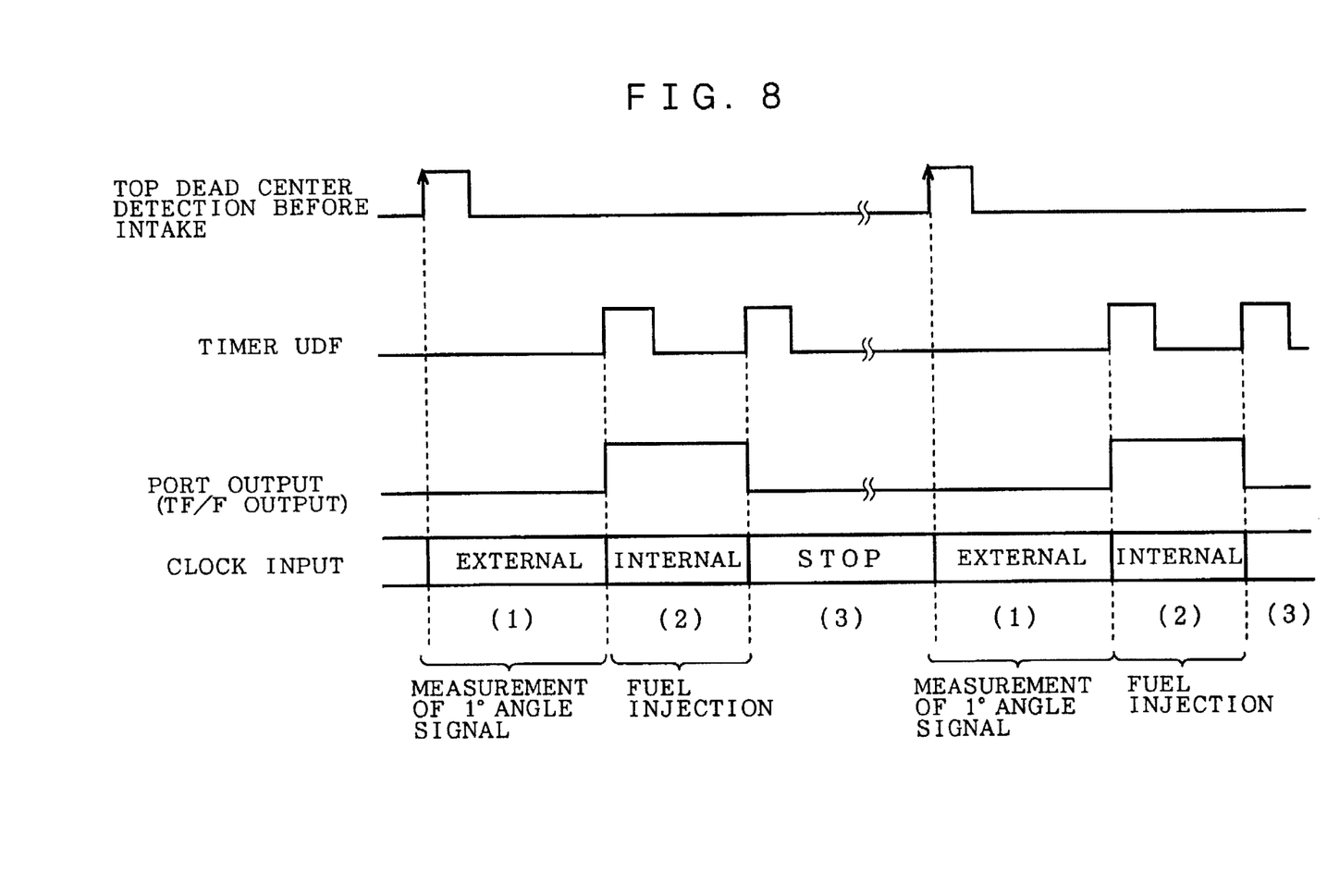
FIG. 8 is a timing chart showing signals input to or output from the timer device of embodiment 1.
Figure 9:
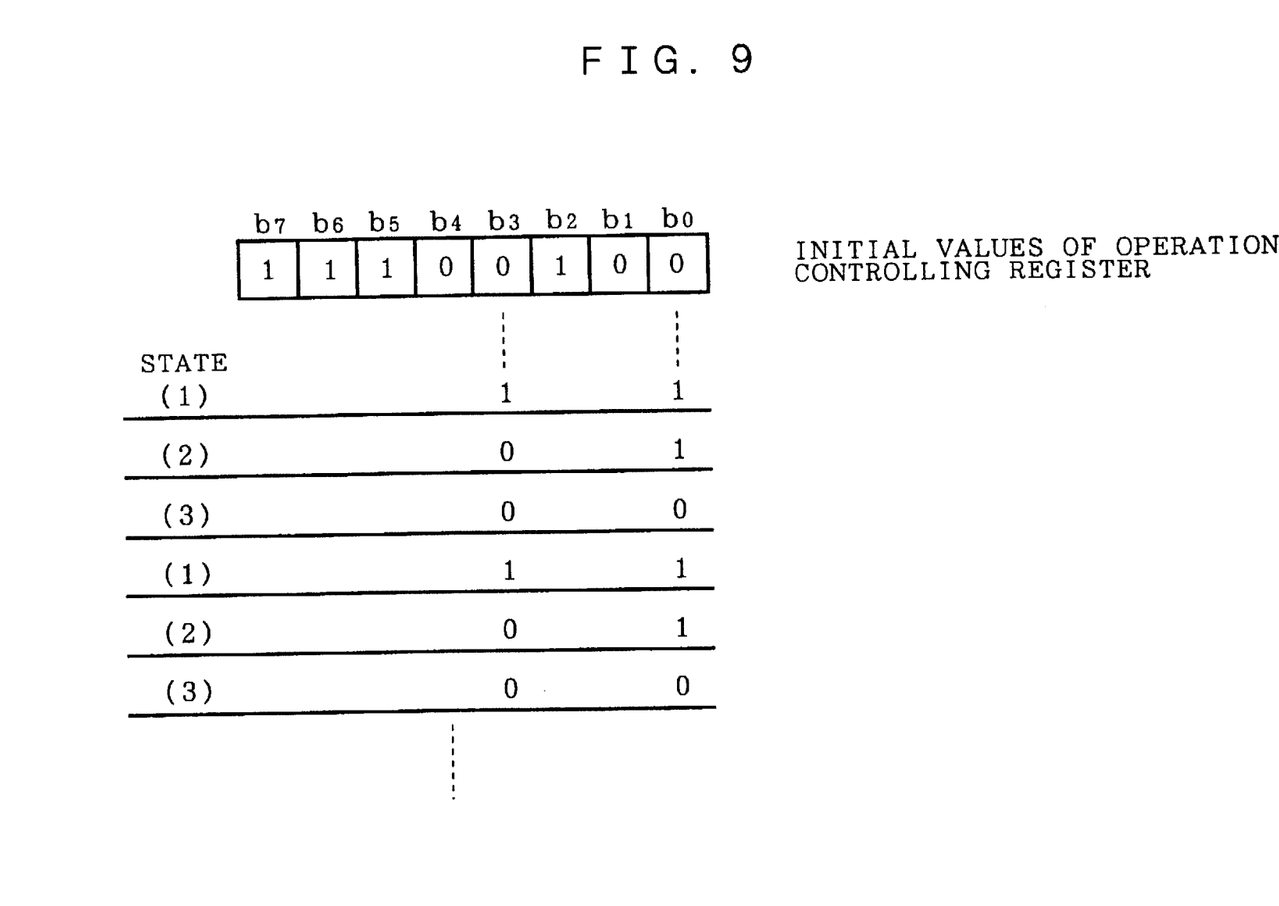
FIG. 9 is a diagram showing initial values stored in the operation controlling register of embodiment 1 and the states of the values of the operation controlling register changing in accordance with the states shown in FIG. 8.

FIG. 8 is a timing chart showing signals input to or output from the timer device 2. FIG. 9 is a diagram showing initial values stored in the operation controlling register 24, and the states of the values of the register 24 changing in accordance with the states shown in FIG. 8.

At first, if the down counter 16 is used on both of the input side and the output side of the timer device 2 in the one shot mode thereof, the values of the operation controlling register 24 are initialized as shown in FIG. 9.

Since the timer function switching signal TF stored in the bit $b_2$ is "1", namely since the external trigger TRG is chosen, in the initialization, the state of the values of the register 24 is changed to a state (1) when the top dead center detecting signal before intake, which is an external trigger TRG, becomes "H". In the state (1), timer operation controlling circuit 11 reloads values "1" and "1" into the bits $b_0$ and $b_3$ of the register 24, respectively. That is, the circuit 11 starts the counting operation of the down counter 16, and chooses the external clock EXT as an input clock to the counter 16. And then, the counter 16 counts the pulses of the 1' angle signal input into the input terminal 13 for inputting the external clock EXT up to the count initial value previously set in the reload register 17a.

The count initial value of the reload register 17b is previously determined by the control of the CPU 1. When the next under flow signal UDF is generated, the determined initial value is immediately set in the reload register 17b by being reloaded in conformity with the reload register choosing signal TR2 output from the timer operation controlling circuit 11.

After counting the pulses of the 1' angle signal up to the count initial value, the down counter 16 outputs an under flow signal UDF indicating the end of counting. Namely, the timer device 2 recognizes the arrival of the time of fuel injection by counting a fixed number of the pulses of the 1' angle signal after the detection of the top dead center before intake. Then, the operation controlling register 24 moves into the state (2). When detecting the under flow signal UDF output by the down counter 16, the timer operation controlling circuit 11 switches the input clock switching signal TC of the operation controlling register 24 to "0". Consequently, the transmission gate 14a turns off, and the transmission gate 14b turns on. Then the clock input into the down counter 16 is changed to the internal clock $\Phi_{IN}$. The under flow signal UDF output from the down counter 16 is further sent to the toggle flip flop 18 and the output gate register 19. Since the output pulse switching signal TP is set to choose the toggle flip flop 18 by means of the output buffers 20a and 20b in the initialization, the output signal of the toggle flip flop 18 is inverted by the under flow signal UDF so that a "H" level signal is output from the output terminal 22 through the output buffer 21. Supplied with the "H" level signal, the engine begins fuel injection. The fuel injection continues until the down counter 16 has counted a count value set by the reload register 17b. After counting the count value, the down counter 16 again generates an under flow signal UDF to move the operation controlling register 24 into the state (3). In the state (3), when the timer operation controlling circuit 11 detects the under flow signal UDF, the circuit 11 changes the timer enable signal TE to "0" to stop the timer operation of timer device 2. When the under flow signal UDF is input into the toggle flip flop 18, the output signal of the flip flop 18 is inverted so that an "L" level signal is output to stop the fuel injection.

Next, when the top dead center detecting signal before intake is again changed to the "H" level, the aforementioned states (1), (2) and (3) are repeated.

As described above, since the timer device 2 of embodiment 1 is constructed to execute predetermined operations at the time of detecting such an occurrence of an external event as a crank arriving at the top dead center, the timer device 2 can perform various controls with few counters without overloading the CPU 1.

EMBODIMENT 2.

Figure 10:
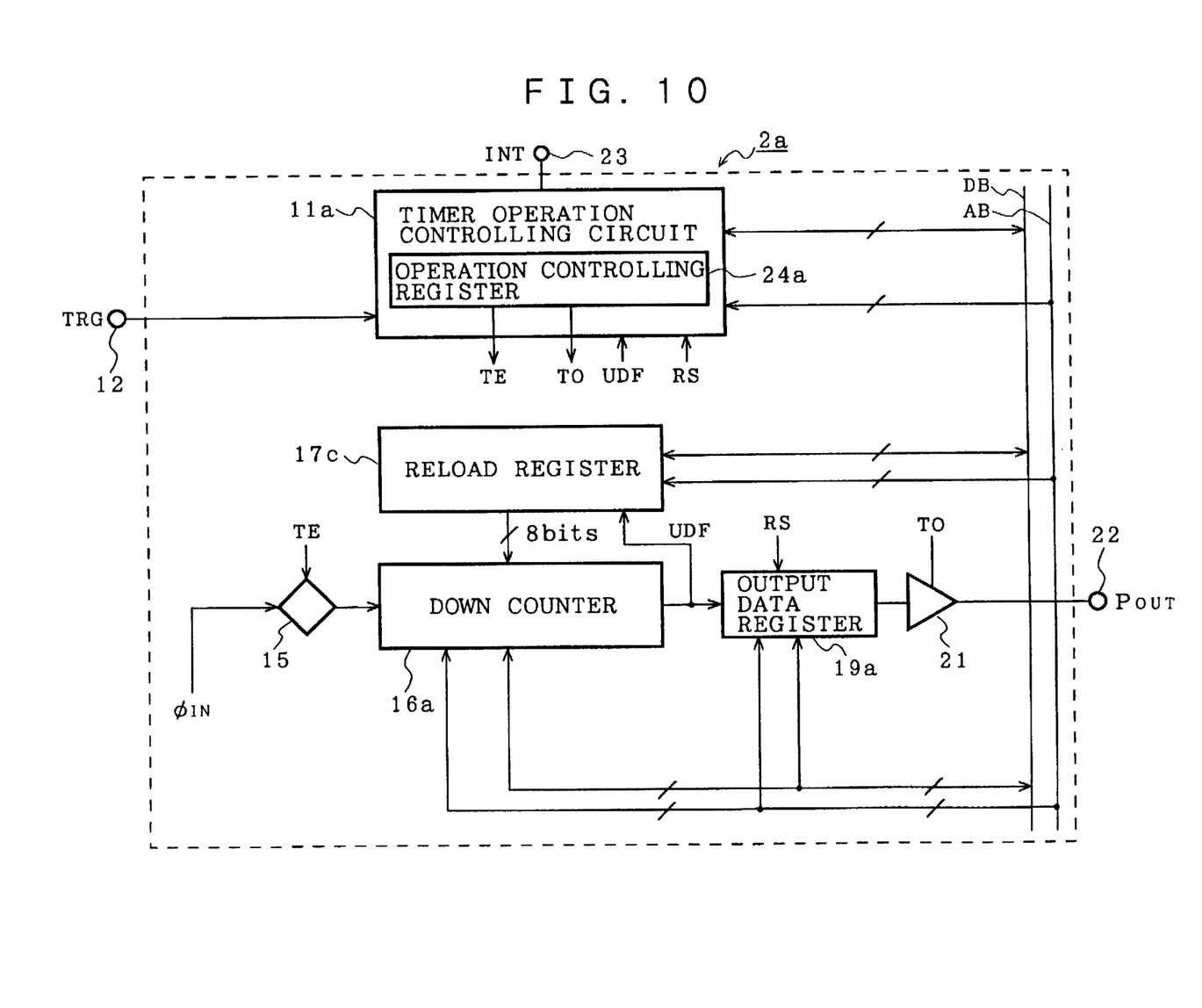
FIG. 10 is a block diagram showing timer device of a second embodiment (embodiment 2) of the present invention.

FIG. 10 is a block diagram showing the timer device of the embodiment 2 of the present invention. In the figure, the same elements as those in FIG. 2 are denoted by the same reference characters as those in FIG. 2, and duplicate description of them is omitted. The timer device 2a shown in FIG. 10 can be exchanged with the timer device 2 in the single chip microcomputer shown in FIG. 1. In FIG. 10, reference numeral 11a denotes a timer operation controlling circuit for controlling the operation of the timer device 2a. Reference numeral 16a denotes a down counter for counting the output signal from the transmission gate 15. Reference numeral 17c denotes a reload register for storing a count initial value transmitted from the CPU 1, and for loading the stored count initial value to the down counter 16a. Reference numeral 19a denotes an output data register for outputting a previously stored data train at every output of an underflow signal UDF from the down counter 16a. Reference numeral 24a denotes an operation controlling register installed in the timer operation controlling circuit 11a for controlling the timer device 2a. The output data register 19a has a function of resetting the output data value thereof to the first data when the operation mode of the timer device 2a is changed. The reset of the output data register 19a is executed by the input of a reset signal RS output from the timer operation controlling circuit 11a into the register 19a. The register 19a has a data length of four bits; the value of the bit $b_3$ is set as a first output at the time of beginning the operation, from the initial state, and at the time of changing the timer mode; the values of the bit $b_2$, the bit $b_1$ and the bit $b_0$ are output successively at each time an under flow signal UDF is output.

Figure 11:
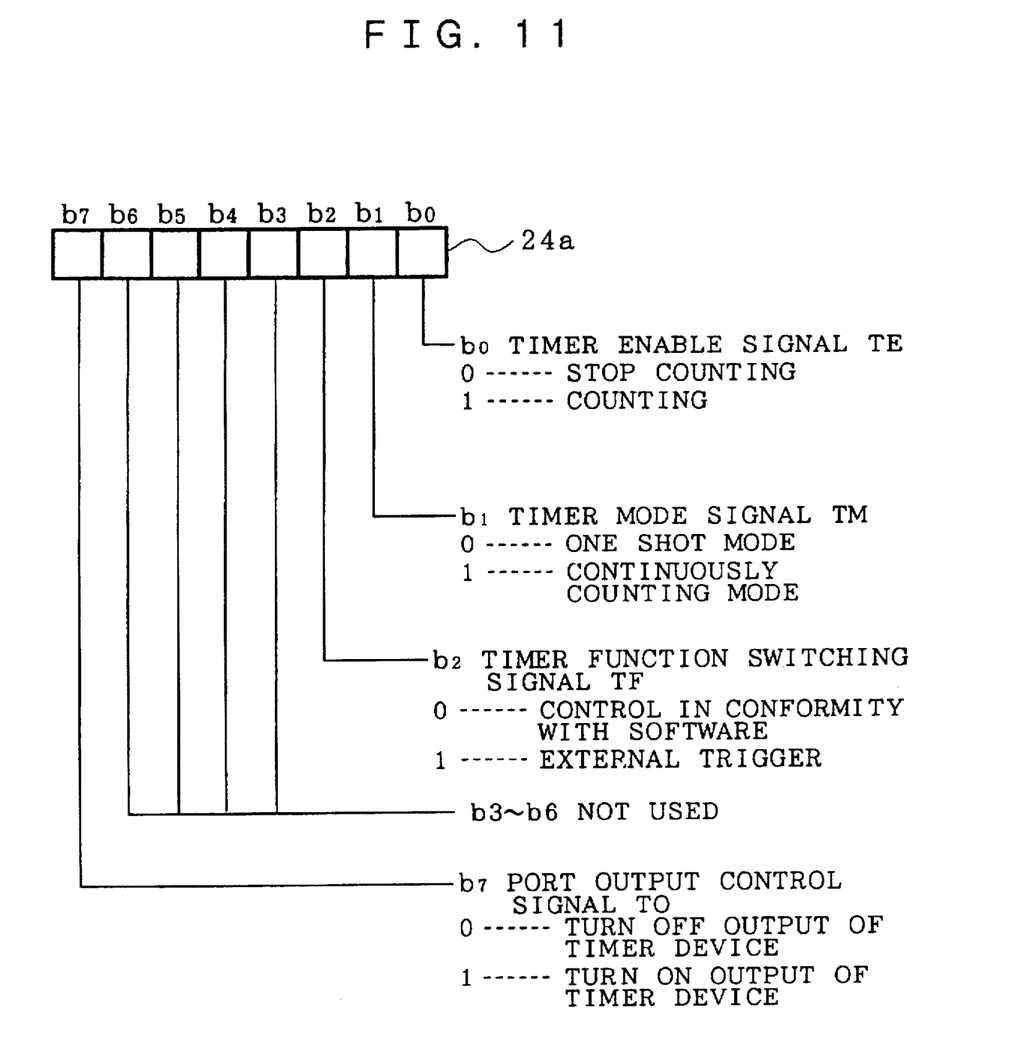
FIG. 11 is a diagram showing the construction of the operation controlling register of embodiment 2.

FIG. 11 is a diagram showing the construction of the operation controlling register 24a. As shown in the figure, the operation controlling register 24a is a register which does not use the fourth bit $b_3$ to the seventh bit $b_6$ of the operation controlling register 24 shown in FIG. 3.

Next, the operation thereof will be described.

Figure 12:
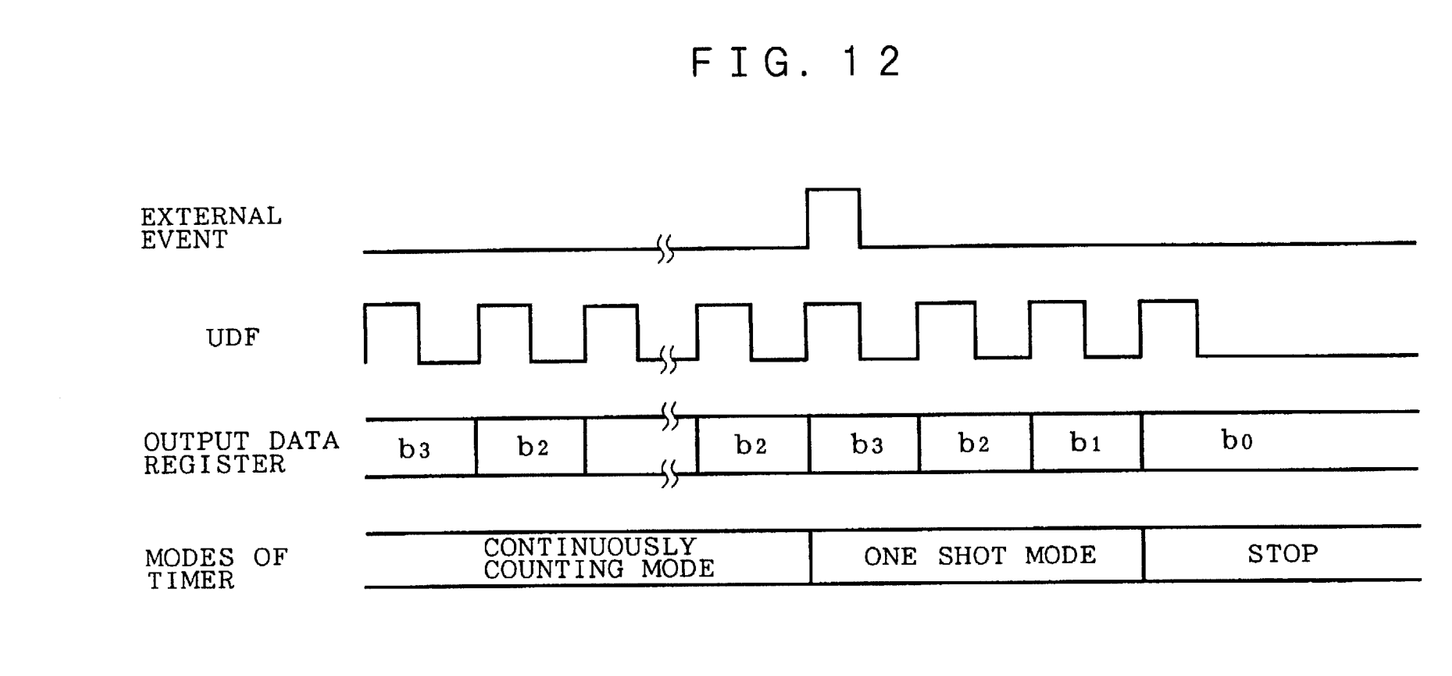
FIG. 12 is a diagram showing the changes of an external trigger which is an external event signal input into the input terminal of embodiment 2, an underflow signal output from the down counter thereof, an output signal of the output data register thereof and the timer modes thereof.

FIG. 12 is a diagram showing the changes of an external trigger TRG, which is an external event signal, input into the input terminal 12, an underflow signal UDF output by the down counter 16a, an output signal of the output data register 19a and the timer modes of the timer device 2a. As shown in FIG. 12, the case where the timer device is operating in the continuously counting mode is considered in the present embodiment. Namely, the case where the timer mode signal TM of the second bit $b_1$ of the operation controlling register 24a is "1" is considered. In the continuously counting mode, data are continuously output from the output data register 19a in the order of the bits $b_3$, $b_2$, $h_1$, $b_0$, $b_3$, .... If an external event occurs during the continuously counting mode, namely when a signal indicating the occurrence of an external event is input from the input terminal 12, the timer operation controlling circuit 11a changes the timer mode signal TM stored in the second bit $b_1$ of the operation controlling register 24a to "0". Thereby, the timer device 2a operates in the one shot mode thereof. After the mode is changed, the timer operation controlling circuit 11a outputs a reset signal RS to the output data register 19a. Thereby, the output data register 19a is reset to operate to output data in order from the bit $b_3$, independently of the output value, just before the resetting. In the example shown in FIG. 12, the value of the bit $b_2$ is output from the output data register 19a immediately before the occurrence of the external event, but the register 19a outputs the bits $b_3$, $b_2$, $b_1$ and $b_0$ at every occurrence of the under flow signal UDF after the occurrence of the external event. After outputting the data of the bit $b_0$, the timer operation controlling circuit 11a changes the timer enable signal TE of the operation controlling register 24a to "0" for ending the timer operation of the timer device 2a.

By adding a circuit capable of appointing the number of times the under flow signal UDF, in the one shot, is input to the timer operation controlling circuit 11a, the timer operation of the timer device 2a can also be stopped after outputting a predetermined number of data, for example one, two or three data, without outputting all data up to the bit $b_0$.

Consequently, since the second embodiment stops after executing the timer operation for a fixed time after the operation of the controlling system has stopped, the second embodiment is particularly applicable to case where the immediate stopping of the timer that has the been controlling an output is not preferred.

EMBODIMENT 3.

Figure 13:
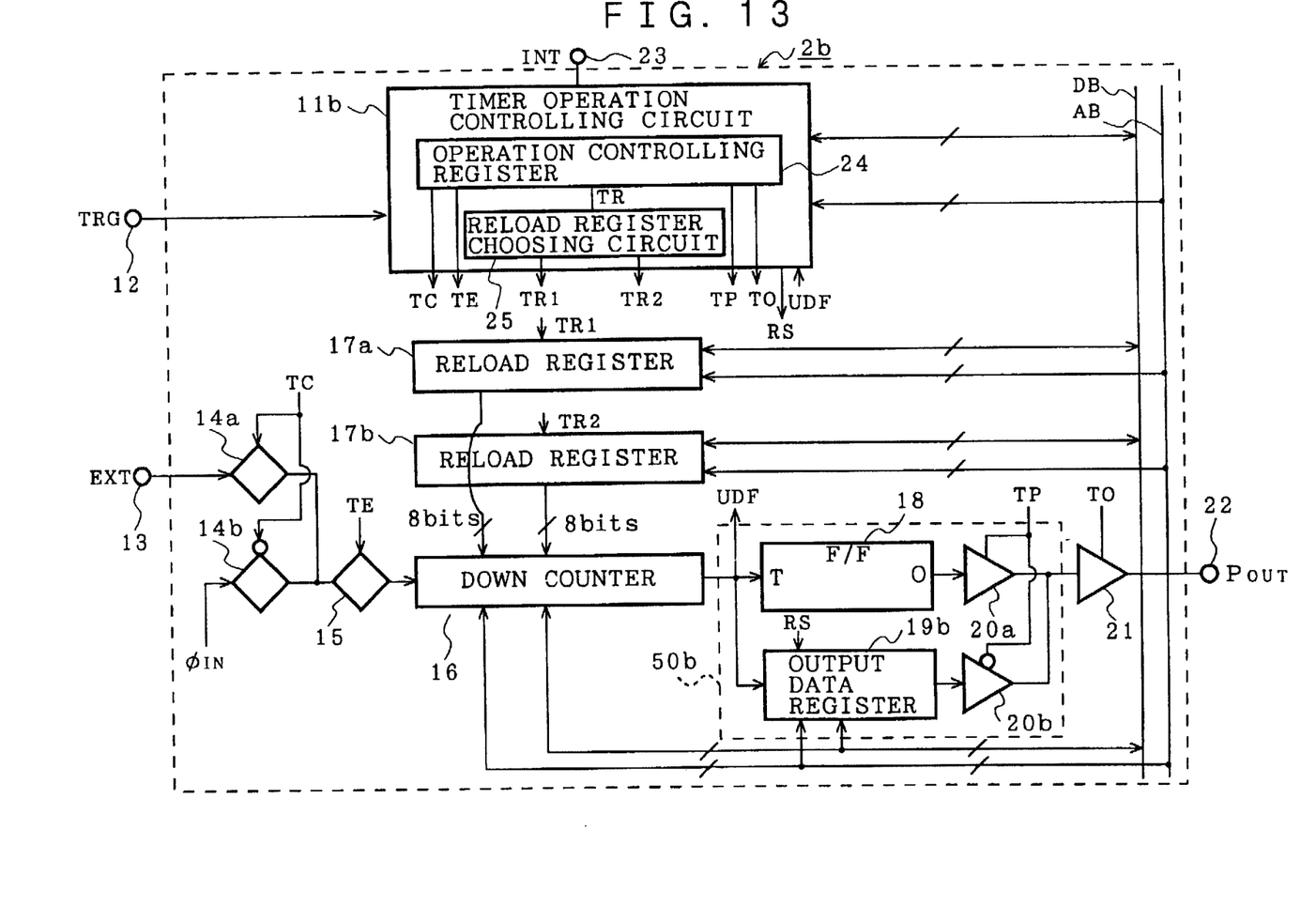
FIG. 13 is a block diagram showing the timer device of the third embodiment (embodiment 3) of the present invention.

FIG. 13 is a block diagram showing the timer device of the third embodiment of the present invention. In the figure, the same elements as those in FIG. 2 are denoted by the same reference characters as those in FIG. 2, and duplicate description is omitted. In FIG. 13, reference numeral 2b denotes the timer device of the embodiment 3. Reference numeral 11b denotes a timer operation controlling circuit for controlling the operation of the timer device 2b. Reference numeral 19b denotes an output data register for outputting a data train previously stored therein each time the down counter 16 outputs an under flow signal UDF. The output data register 19b has a function of resetting the output data to the data of the first bit when the operation mode of the timer device 2b is changed. The reset of the output data register 19b is executed by the input of a reset signal RS output from the timer operation controlling circuit 11b into the register 19b. The register 19b has a data length of four bits; the value of the bit $b_3$ of the four is set as a first output at the time of beginning the operation, thereof from the initial state, and at the time of changing of the timer mode of the timer device 2b; the values of the bit $b_2$, the bit $b_1$ and the bit $b_0$ are output successively at each output of an under flow signal UDF. Reference numeral 50b denotes a control signal generating circuit composed of the toggle flip flop 18, the output data register 19b and the output buffers 20a and 20b.

The timer device 2b of embodiment 3 can be exchanged with the timer device 2 in the single chip microcomputer shown in FIG. 1 in use. Since the operation controlling register 24 is the same one shown in FIG. 3, which was described as for embodiment 1, duplicate description is omitted.

Next, the operation will be described.

When the timer mode signal TM of the operation controlling register 24 is set to be "1" and the input clock switching signal TC thereof is set to be "0", the timer device 2b executes the continuously counting mode in conformity with the internal clock $\Phi_{IN}$. When a signal indicating the occurrence of an external event is input from the input terminal 12, as described as to FIG. 12 of embodiment 2, the timer device 2b is changed from the continuously counting mode to the one shot mode.

If the output pulse switching signal TP is "1" in this case, the timer operation controlling circuit 11b stops the counting operation of the timer device 2b by setting the timer enable signal TE of the operation controlling register 24 to be "0" after a predetermined number of changes of the output of the toggle flip flop 18, namely the changes of the signal to be inverted from the "H" level to the "L" level, and vice versa, successively, is output from the output terminal 22. On the other hand, if the output pulse switching signal TP is "0" in this case, the timer operation controlling circuit 11b stops the counting operation of the timer device 2b by setting the timer enable signal TE of the operation controlling register 24 to be "0" after every data stored in the output data register 19b are output one time, in order. The counting operation may be stopped at the time when a predetermined number of the data stored in the output data register are output.

As described above, the present embodiment stops the operation after executing the timer operation for a fixed time after the controlling system stopped its operation, so the embodiment is applicable to a control such as when immediate stopping of the timer controlling an output until is not preferred.

EMBODIMENT 4.

Figure 14:
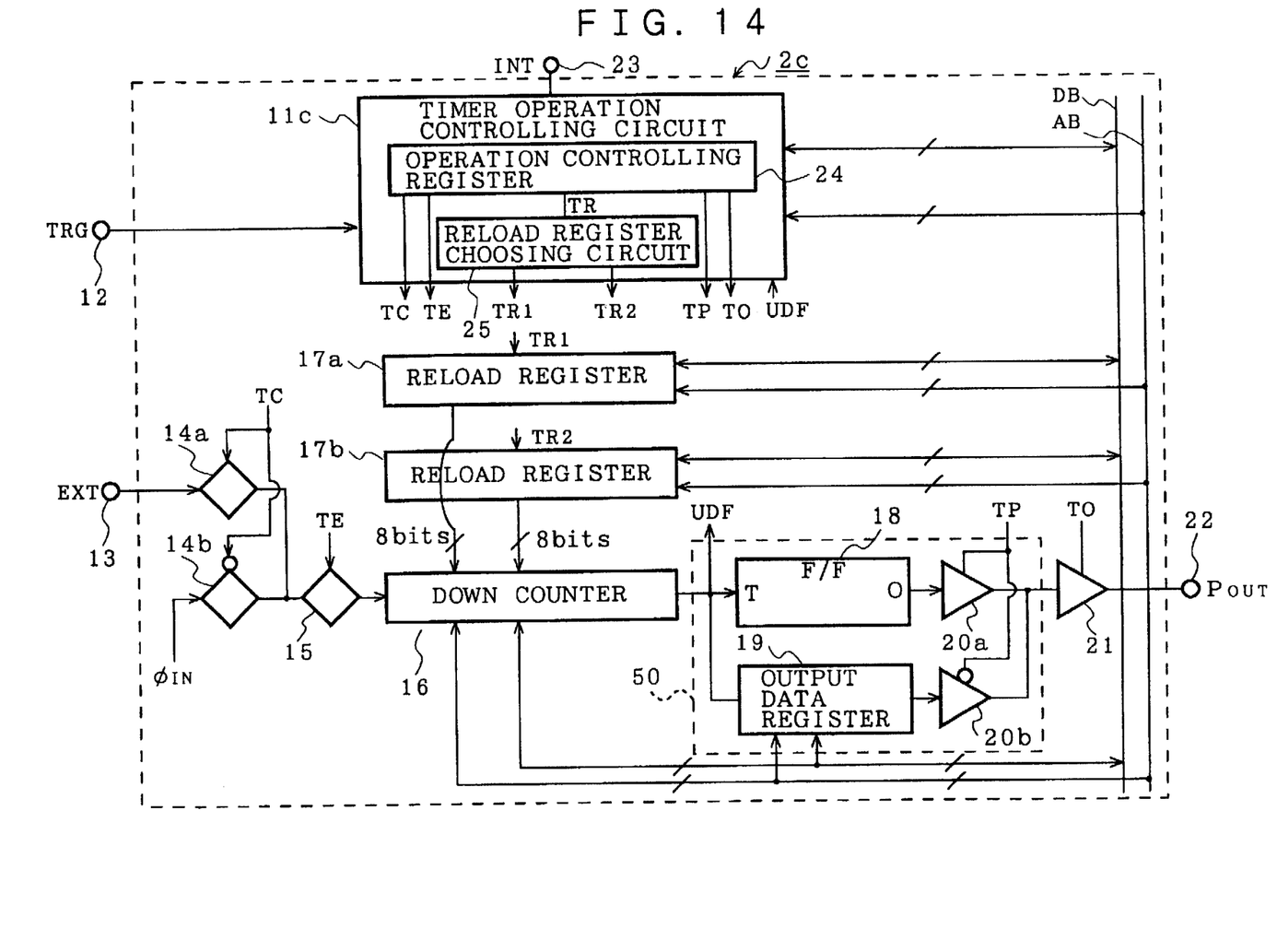
FIG. 14 is a block diagram showing the timer device of the fourth embodiment (embodiment 4) of the present invention.

FIG. 14 is a block diagram showing the timer device of the fourth embodiment of the present invention. In the figure, the same elements as those in FIG. 2 are denoted by the same reference characters as those in FIG. 2, and duplicate description is omitted. In FIG. 14, reference numeral 2c denotes the timer device of the fourth embodiment. Reference numeral 11c denotes a timer operation controlling circuit for controlling the operation of the timer device 2c. The timer operation controlling circuit 11 of embodiment 1 operates to start a counting operation in conformity with the one shot mode when a signal indicating the occurrence of an external event is input. The timer operation controlling circuit 11c of the present embodiment has a function of outputting a pulse width modulated PWM signal from the output terminal 22 when the occurrence of an external event is input from the input terminal 12. The timer device 2c of the present embodiment can be exchanged with the timer device 2 in the single chip microcomputer shown in FIG. 1 in use. Since the operation controlling register 24 is the same one shown in FIG. 3 which was described as for the first embodiment, the duplicate description is omitted.

Next, the operation thereof will be described.

Suppose that the reload register choosing signals TR1 and TR2 of the operation controlling register 24 are set to be "0" and "0", respectively, in the initialization, and that the reload register 17a is chosen. Also suppose that the output pulse switching signal TP is set to be "0" and the output data register 19 is chosen. Furthermore, suppose that the timer mode signal TM is set to be "1" and the continuously counting mode is chosen.

In this case, if the timer function switching signal TF is set to be "1", the timer device 2c moves to the pulse width modulation signal outputting mode in accordance with the occurrence of an external event signal. Entering this mode, the timer operation controlling circuit 11c changes the output pulse switching signal TP to "1" to choose the toggle flip flop 18. And then, the data of the pulse width modulation signal are stored in the reload registers 17a and 17b from the CPU 1 in order. The stored data are stored in the down counter 16 in conformity with the reload register choosing signals TR1 and TR2 from the timer operation controlling circuit 11c successively. The down counter 16 begins to count down from the initial value loaded by the reload registers 17a and 17b, and outputs an under flow signal UDF when the counting ends. The toggle flip flop 18 inverts the output signal at every output of the under flow signal UDF from the down counter 16. Consequently, a pulse having a length corresponding to the values of the data loaded in the reload registers 17a and 17b is output from the output terminal 22. That is to say, when a signal indicating the occurrence of an external event is input into the input terminal 12, a PWM signal is output from the output terminal 22.

Therefore, the timer device 2c of the embodiment is suitable in a control in which the timer device 2c operating in the continuously counting mode receives a signal indicating the occurrence of an external event to output a PWM signal.

It will be appreciated from the foregoing description that, according to the first aspect of the present invention, since the timer device is constructed to control the counting operation of the counter on a state change signal indicating a change of the state of an external apparatus, the timer device has an advantage that much various timer controls can be executed without overloading the CPU.

Furthermore, according to the second aspect of the present invention, since the timer device is constructed so as to load the counter with a first count initial value from the first register to make the counter execute a count operation when a state change signal of an external apparatus is input, and to load the counter with a second count initial value from the second register to make the counter execute its count operation when the counting of the first count initial value ends, the timer device has an advantage that extensive timer controls can be executed with few counters.

Furthermore, according to the third aspect of the present invention, since the timer device is constructed so that a pulse signal output from an external apparatus is supplied to the counter when a signal indicating a change of the state of the external apparatus is input into the timer device, and an internal clock is supplied to the counter after a first count initial value has been counted, the timer device has an advantage that extensive timer controls can be executed.

Furthermore, according to the fourth aspect of the present invention, since the timer device is constructed so as to change the mode of the counter from a continuously counting mode to a one shot mode when a signal indicating the change of the state of an external apparatus is input while the counter is operating in the continuously counting mode, the timer device has an advantage that extensive timer controls can be executed.

Furthermore, according to the fifth aspect of the present invention, since the timer device is constructed so as to stop the operation of the counter after resetting the output data register and outputting a predetermined number of stored data from the first data in order when a signal indicating a change of the state of an external apparatus is input, the timer device has an advantage that timer control can be executed without overloading especially the CPU and the like in case the timer device stops operation after executing a predetermined process from the continuously counting mode.

Furthermore, according to the sixth aspect of the present invention, since the timer device is constructed so as to output a pulse having a width corresponding to the magnitude of a first count initial value and a second count initial value when a signal indicating a change of the state of an external apparatus is input from the external apparatus while the counter operates in the continuously counting mode, the timer device has an advantage that timer control can be executed without overloading, especially the CPU, in outputting a PWM signal from the continuously counting mode.

While preferred embodiments of the present invention have been described using specific terms, such description is for illustrative purposes only, arid it is to be understood that changes and variations may be made without departing from the spirit or scope of the following claims.

What is claimed is:

1. A timer device for controlling an external apparatus, said time device comprising:

first input means for receiving a pulse signal output from an external apparatus, a counter for counting pulses of the pulse signal up to an initial count value and outputting a count ending signal upon counting to the initial count value, control signal generating means for generating a signal for controlling the external apparatus in response to the count ending signal output by said counter, second input means for inputting to said counter a state change signal indicating a change of state of the external apparatus, and count operation controlling means for controlling counting by said counter in response to the state change signal.

2. The timer device according to claim 1, wherein said count operation controlling means includes a first register for storing a first initial count value, and a second register for storing a second initial count value, and wherein said count operation controlling means loads said counter with the first initial count value when the state change signal is input to said second input means, and loads said counter with the second initial count value when said counter has counted to the first initial count value.

3. The timer device according to claim 2, further comprising signal choosing means for choosing one of the pulse signal and an internal clock of said timer device to be supplied to said counter, and wherein said count operation controlling means controls said signal choosing means so that the pulse signal is chosen when the state change signal is input to said second input means, and that the internal clock is chosen after said counter has counted up to the first initial count value.

4. The timer device according to claim 1, wherein said count operation controlling means changes said counter from a continuously counting mode to a one shot mode when the state change signal is input to said second input means while said counter is in the continuously counting mode.

5. The timer device according to claim 4, wherein said control signal generating means includes an output data register for outputting one stored data unit of a plurality of stored data units, in order of storage, each time the count ending signal is output by said counter, and wherein said count operation controlling means controls said counter to stop counting after resetting of said output data register and outputs a predetermined number of stored data units from the output data register, in order of storage, when the state change signal is input to said second input means.

6. The timer device according to claim 1, wherein said count operation controlling means includes a first register for storing a first initial count value, and a second register for storing a second initial count value, and wherein said count operation controlling means loads said counter with the first initial count value and the second initial count value when the state change signal is input to said second input means while said counter is in a continuously counting mode, and, further, wherein said control signal generating means inverts the control signal each time the count ending signal is output by said counter and generates a pulse having a width corresponding to the first initial count value and the second initial count value, so that said control signal generating means outputs a pulse width modulated signal.

* * * * *